United States Patent

Takayama et al.

Patent Number: 5,442,269
Date of Patent: Aug. 15, 1995

[54] ROBOT CONTROL SYSTEM

[75] Inventors: Kuniharu Takayama, Kawasaki; Hiroyuki Kano, Hiki, both of Japan

[73] Assignee: Fujitsu Limited, Kawasaki, Japan

[21] Appl. No.: 118,747

[22] Filed: Sep. 10, 1993

[30] Foreign Application Priority Data

Mar. 12, 1993 [JP]  Japan .................. 5-052233

[51] Int. Cl.$^6$ .................................... B25J 9/18
[52] U.S. Cl. .................. 318/568.11; 318/568.21; 318/568.13; 318/568.16
[58] Field of Search .............. 318/568.11, 568.21, 318/568.13, 568.16

[56] References Cited

U.S. PATENT DOCUMENTS

| | | | |
|---|---|---|---|
| 4,156,835 | 5/1979 | Whitney et al. | 318/561 |
| 4,549,276 | 10/1985 | Inaba et al. | 318/568.13 |
| 4,685,067 | 8/1987 | French et al. | 318/568.13 |
| 5,159,249 | 10/1992 | Megherbi | 318/568.11 |
| 5,194,792 | 3/1993 | Hara | 318/568.13 |
| 5,276,390 | 1/1994 | Fisher et al. | 318/568.11 |
| 5,283,508 | 2/1994 | Komatsu | 318/568.11 |
| 5,291,137 | 3/1994 | Freedman | 324/303 |

*Primary Examiner*—William M. Shoop, Jr.
*Assistant Examiner*—Karen Masih
*Attorney, Agent, or Firm*—Staas & Halsey

[57] ABSTRACT

A robot control system includes: an end effector for acting upon an object to be worked; a manipulator mechanically supporting the end effector to apply predetermined movements to the end effector; a plurality of sensors mounted on the end effector to detect a position (x) of the end effector and a force (f) between the end effector and the object and to obtain an acceleration speed ($x''$), a speed ($x'$) and a work rate ($-x'f$) of the end effector; a pre-controller for controlling movement of the end effector and the manipulator; a plurality of selection function units connected in parallel to the pre-controller and at least one of the selection function units being selected in accordance with the acceleration speed ($x''$), the speed ($x'$) and the work rate ($-x'f$); and a plurality of control units each connected to a corresponding selecting function unit for inputting a target trajectory ($x_d$) of the end effector and for outputting a control signal (u) to the pre-controller to control movement of the end effector and the manipulator; wherein, the selection function unit is selected in accordance with a value of either "0" or "other than 0" of the acceleration speed, the speed and the work rate; and the control signal from the control unit corresponding to the selection function unit is input to the pre-controller to control movement of the end effector and the manipulator through the selection function unit.

4 Claims, 5 Drawing Sheets

Fig.3

ROBOT CONTROL SYSTEM

BACKGROUND OF THE INVENTION

1. Field of the Invention

The present invention relates to a robot control system and more particularly, it relates to a robot control system which selects a suitable set of functions in accordance with a force, an acceleration, a velocity and a work rate. The robot control system according to the present invention can control an end effector and a manipulator of a robot for a suitable operation based on a control signal from a control means which is provided in correspondence with a selective function device. The work rate is given by a product of speed and force.

2. Description of the Related Art

In general, a robot is formed of an end effector (or, hand) provided at the end of an arm (a manipulator) to grasp/push an object, a plurality of sensors mounted at the end effector for detecting a force, a position, and an orientation of the end effector, and a control unit for controlling the operation of the manipulator.

There are three different control methods well-known in the conventional art, i.e., a force control method, a position control method, and a stiffness/dumping control method, in accordance with the relationship between the end effector and the object. That is, these methods are distinguished in accordance with the following states, i.e., first, a contacting state (or, non-contacting state) between the end effector and the object, second, characteristics of the object (i.e., rigid or non-rigid body), and third, the state of the object (i.e., fixed or not fixed).

Concretely, the force control method is used for a contacting state between the end effector and a fixed and rigid object. The position control method is used for a non-contacting state between the end effector and an object. The stiffness/dumping control method is used for a contacting state between the end effector and a not fixed or non-rigid object.

Furthermore, the force control method and the position control method can be combined with each other, and this combination is called a hybrid position/force control method. Also, the position control method and the stiffness/dumping control method can be combined with each other, and this combination is called an impedance control method.

As is obvious from the above, the hybrid control method is only used for contacting or non-contacting state between the end effector and the fixed and rigid object, and the impedance control method is only used for contacting or non-contacting state between the end effector and the not fixed or non-rigid object.

However, there is no general method which is able to cover both of these two methods in the conventional art.

SUMMARY OF THE INVENTION

The object of the present invention is to provide a robot control system which is able to adapt to control of all states of an end effector and a manipulator including contacting/non-contacting states, rigid/non-rigid states and fixed/not fixed states.

In accordance with the present invention, there is provided a robot control system including: an end effector for acting on an object to be worked; a manipulator mechanically supporting the end effector to apply predetermined movements to the end effector; a plurality of sensors mounted on the end effector to detect a position (x) of the end effector and a force (f) between the end effector and the object and to obtain an acceleration $(x'')$, a velocity $(x')$ and a work rate $(-x'f)$ of the end effector; a pre-controller for controlling movement of the end effector and the manipulator; a plurality of selection function units connected in parallel to the pre-controller and at least one of the selection function units being selected in accordance with the acceleration $(x'')$, the velocity $(x')$ and the work rate $(-x'f)$; and a plurality of control units each connected to a corresponding selection function unit for inputting a target trajectory $(x_d)$ of the end effector and for respectively outputting corresponding control signals which in the composite comprise a total control signal (u) to the pre-controller to control movement of the end effector and the manipulator;

wherein, each of the selection function unit s is selected or selectively enabled thereby to select the respectively corresponding control unit in accordance with a varying combinations of the respective values of the acceleration, the velocity and the work rate; being zero, or not zero and the control signal from the respective control unit corresponding to the enable selection function unit is input to the pre-controller, to control movement of the end effector and the manipulator, through the thus enabled selection function unit.

As a preferred embodiment, the selection function unit utilizes a Kronecker delta function.

As another preferred embodiment, the movement of the manipulator is defined by the following formula for one direction component, $$mx'' + bx' + kx = u + f$$

where, "x" denotes the position of the end effector, "x'" denotes the velocity of the end effector, "x''" denotes the acceleration velocity of the end effector, "f" denotes the force applied from the object to the end effector, "u" denotes the control signal generated by the control unit, m denotes a weight, "b" denotes a viscosity, and "k" denotes an elasticity. Further, each of these values is defined by a "scalar".

As still another preferred embodiment, eight kinds of Kronecker delta functions are given as the selection function means.

DESCRIPTION OF THE PREFERRED EMBODIMENTS

Figure 1:
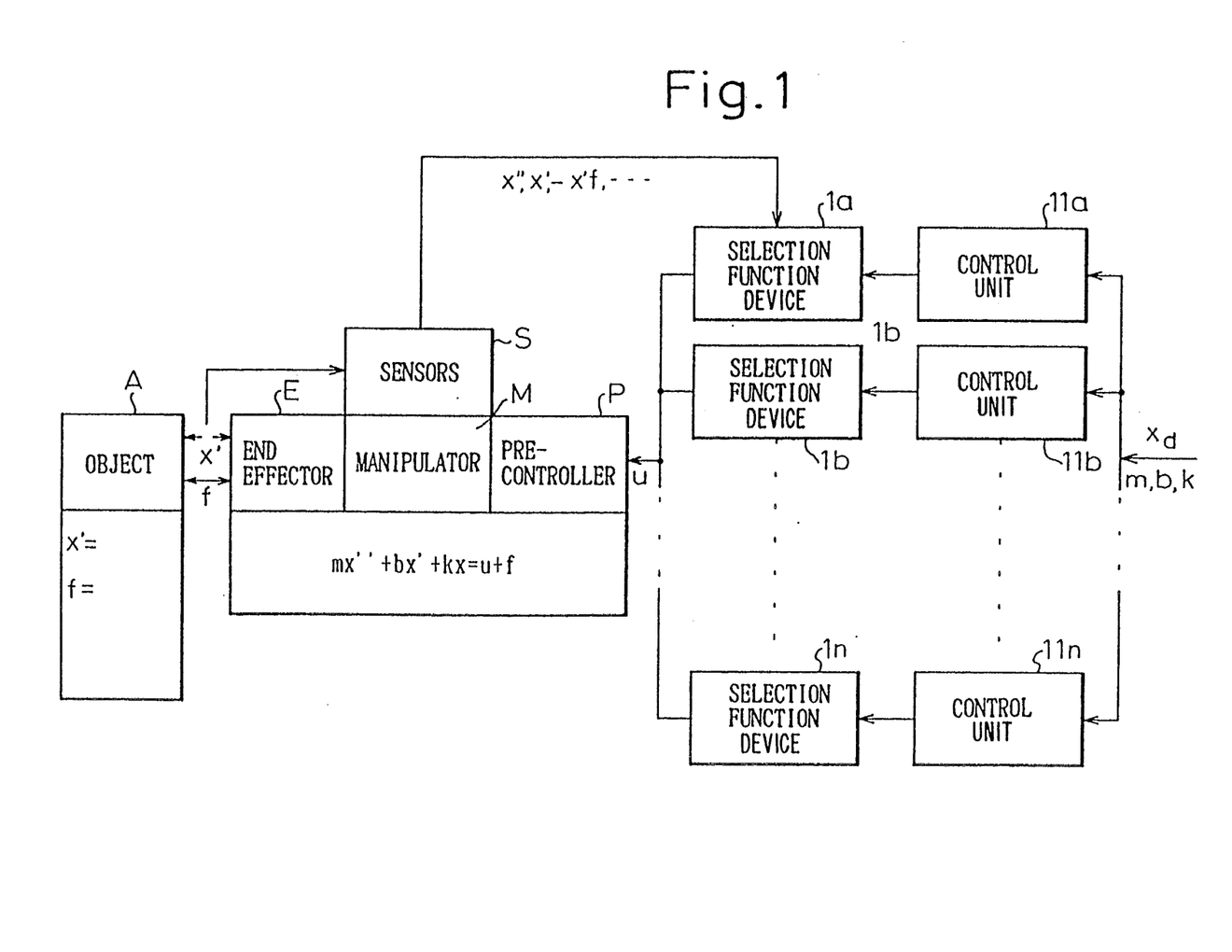
FIG. 1 is a basic block diagram of a robot control system according to the present invention.

FIG. 1 is a basic block diagram of a robot control system according to the present invention. This new control method according to the present invention is called a "selective control method". In FIG. 1, "A" denotes an object to be acted upon, "E" denotes an end effector to act on the object, "S" denotes sensors for detecting various forces from the object and a position of the end effector, "M" denotes a manipulator for mechanically supporting the end effector, "P" denotes a pre-controller for controlling operation of the manipulator, 1a to 1n denote selection function means, and 11a to 11n denote control unit.

Where acceleration is expressed by x", velocity is expressed by x', and a work rate is expressed by −x'f.

Each selection function means 1a to 1n is selected by each value of the acceleration x" the velocity x', and the work rate −x'f as explained in detail below.

The control units 11a to 11n are provided for respective selection function devices 1a to 1n. A target trajectory "$x_d$" for the position of the end effector E is input in parallel to each control units, and the control units generates a control signal "u" through each selecting function devices 1a to 1n.

As explained in detail below, any one of the selection function devices is selected in accordance with a value of either "0" or "other than 0" (indicated by "?" in the drawings) of the acceleration x", the velocity x' and the work rate −x'f.

When a given one of the selection function devices is selected, the control signal "u" is input from the corresponding control unit and the respective selection function device to the pre-controller P to control the manipulator M. In this embodiment, a so-called Kronecker delta function or an enlarged Kronecker delta function is used as the selection function devices.

Further operation of the manipulator is defined by the following formula.

$$mx''+bx'+kx=u+f$$

where, "x" denotes the position of the end effector, "x'" denotes the velocity of the end effector which is obtained from the differential of the position "x", and "x''" denotes the acceleration which is obtained from the differential of the velocity "x'", "f" denotes a force applied from the object to the end effector, denotes the control signal, "m" denotes a weight, "b" denotes a viscosity, and "k" denotes an elasticity. In this embodiment, all these values are given by scalar values.

The end effector E is mounted at the end of the manipulator M, and executes various operations by contacting the object A. The pre-controller P is provided at the manipulator M to control the operation thereof. The outputs of all of the selection function devices 1a to 1n are input to the pre-controller P, and each selection function devices receives the information of the acceleration x" the velocity x' and the work rate −x'f which are detected by the sensors S.

An individual one of the selection function devices is selected in accordance with the acceleration speed x" the speed x' and the work rate −x'f. The control signal "u" of the corresponding control unit connected to the selected one of the selection function devices, is output to the pre-controller P thereby to control the manipulator M.

Before explaining preferred embodiments, the basic theory of the present invention will be explained in detail below.

First, an explanation will be given for the case where the end effector E contacts or does not contact the object A. The following explanation is given for a unidirectional component of the manipulator M, thereby to simplify the explanation.

A basic formula is explained as follows.

The formula indicating a component of one optional direction of the manipulator is given as follows:

$$mx''+bx'+kx=u+f \quad (1)$$

wherein, "x" denotes the position of the end effector, "x'" denotes the velocity of the end effector which is obtained from the differential of the position "x", and "x''" denotes the acceleration which is obtained from the differential of the velocity "x'", "f" denotes the force applied from the object to the end effector, "u" denotes the control signal, "m" denotes the weight, "b" denotes the viscosity, and "k" denotes the elasticity. In this case, all these values are given by scalar values.

Case (1) When the end effector contacts a fixed and rigid object, the formula is explained as follows.

When the end effector contacts a fixed and rigid object, the end effector enters a static state. Accordingly, the speed x' of the end effector is given as zero:

$$x'=0 \quad (2)$$

When the position x is "$x_c$", from the formula (2):

$$x=x_c \quad (3)$$

wherein, $x_c$ is a constant scalar value.

From formulas (1) and (3):

$$f=k\,x_c-u \quad (4)$$

Case (2) When the end effector does not contact the object, the formula is explained as follows.

When the end effector does not contact the object, it does not take a force from the object A. Accordingly, the force f of the end effector is given as zero:

$$f=0 \quad (5)$$

From formulas (1) and (5):

$$mx''+bx'+kx=u \quad (6)$$

Case (3) When the end effector contacts a not fixed or non-rigid object, the formula is expressed approximately as follows:

$$-f\approx-(m_e x''+b_e x'+k_e x) \quad (7)$$

wherein, $m_e$, $b_e$, and $k_e$ denote constant scalars indicating impedance of the object A.

From formulas (1) and (7):

$$(m+m_e)x''+(b+b_e)x'+(k+k_e)x=u \quad (8)$$

Figure 2:
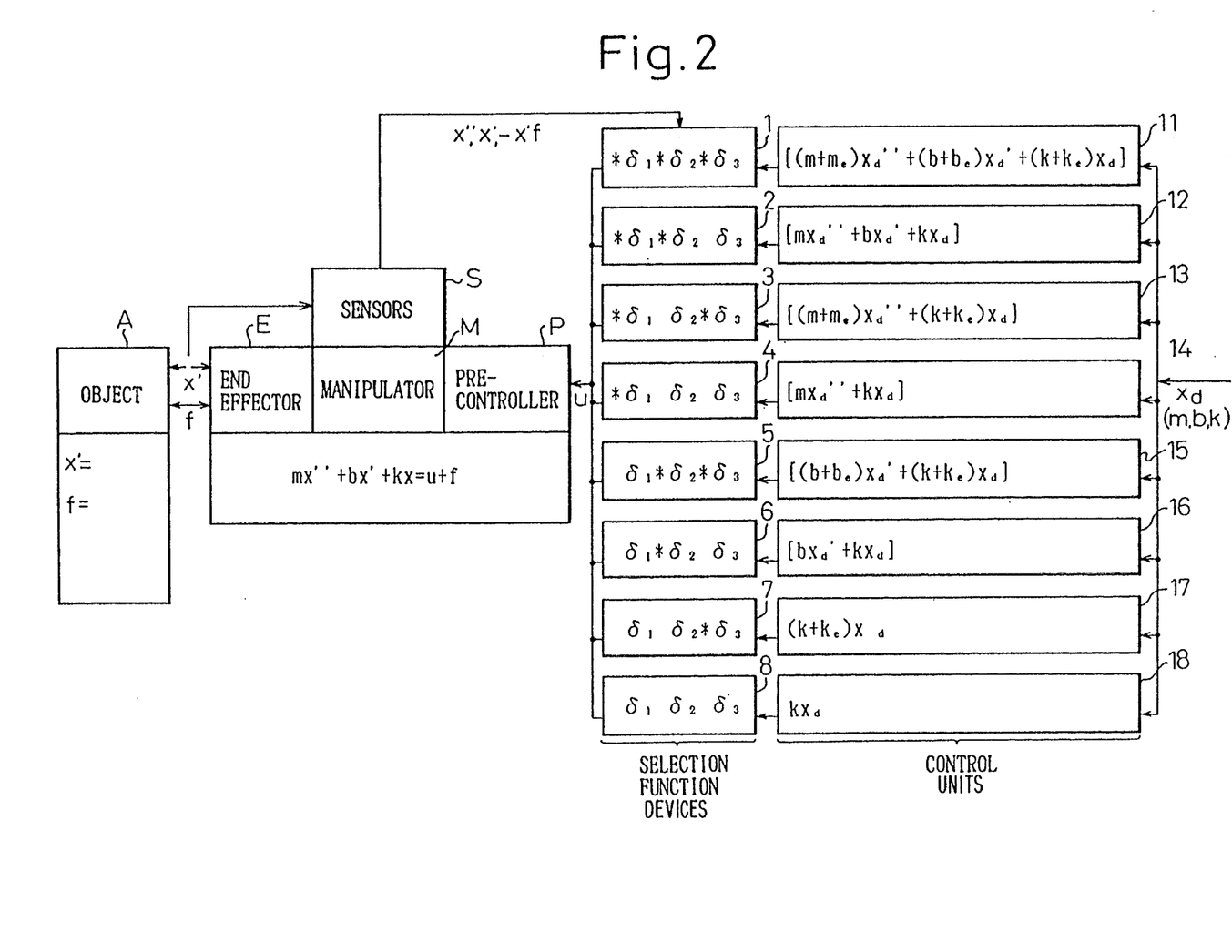
FIG. 2 is a block diagram of a robot control system according to an embodiment of the present invention.

FIG. 2 is a block diagram of a robot control system according to an embodiment of the present invention. The same reference letters as used in FIG. 1 are attached to the same components in this drawings. As shown in the drawing, eight selection function devices 1 to are provided in this embodiment. Accordingly, eight controllers 11 to 18 are provided for the respective, corresponding selection function devices 1 to 8. Each of the selection function devices 1 to 8 is defined based on three kinds of values which are input from sensors S, i.e., the acceleration x" of the end effector, the velocity x' of the end effector, and the work rate −x'f indicating the work from the end effector E to the object A. That is, when these three values are given by a value of either "0" or "other than 0", the selection function value becomes "1" or "0" so that following eight sets of selection function devices can be obtained.

$$(*\delta_1 *\delta_2 *\delta_3)$$

$$(*\delta_1 *\delta_2 \delta_3)$$

$$(*\delta_1 \delta_2 *\delta_3)$$

$$*\delta_1 \delta_2 \delta_3 \quad (9)$$

$$(\delta_1 *\delta_2 *\delta_3)$$

$$(\delta_1 *\delta_2 \delta_3)$$

$$(\delta_1 \delta_2 *\delta_3)$$

$$(\delta_1 \delta_2 \delta_3)$$

Where, $\delta$ denotes the Kronecker delta function, "*" denotes an inverted value of the function $\delta$. Further, for example, the function of the first row $(*\delta_1 *\delta_2 \delta_3)$ denotes a product of $*\delta_1$, $*\delta_2$, and $\delta_3$. As is obvious, the above eight selection functions correspond to the selection function devices 1 to 8 of FIG. 2, respectively.

Further, the function $\delta_i (i=1, 2, 3)$ is defined as follows:

$$\delta_1 = \delta(x'', 0)$$

$$\delta_2 = \delta(x', 0) \quad (10)$$

$$\delta_3 = \delta(-x'f, 0)$$

$$*\delta_i = 1 - \delta_i \, (i=1, 2, 3) \quad (11)$$

Still further, the function $\delta(a, b)$ is defined as follows:

$$\delta(a, b) = 1 \text{ (when } a=b) \text{ or } 0 \text{ (when } a \neq b) \quad (12)$$

The formula (12) shows an ideal form mathematically to simplify the explanation. In actuality, the following formula is defined as an enlarged Kronecker delta function instead of the formula (12).

$$\delta_e(a, b) = 1(|a-b| \leq e) \text{ or } = 0(|a-b| > e) \quad (13)$$

wherein, "e" denotes a small positive constant scalar.

The operation of each of the controllers 11 to 18 in FIG. 2 is explained below. As explained above, in the present invention, the suitable controller is selected in accordance with contacting/not-contacting, rigid/non-rigid, and fixed/not fixed states between the end effector and the object. By using the set of selection functions in the formula (9), the total control signal "u" is defined as follows.

$$\begin{aligned}
u = &(*\delta_1 *\delta_2 *\delta_3)\,((m + m_e)x_d'' + (b + b_e)x_d' + \\
&(k + k_e)x_d) + \\
&(*\delta_1 *\delta_2 \delta_3)\,(mx_d'' + bx_d' + kX_d) + \\
&(*\delta_1 \delta_2 *\delta_3)\,((m + m_e)x_d'' + (k + k_e)x_d) + \\
&(*\delta_1 \delta_2 \delta_3)\,(mx_d'' + kx_d) + \\
&(\delta_1 *\delta_2 *\delta_3)\,((b + b_e)x_d' + (k + k_e)x_d) + \\
&(\delta_1 *\delta_2 \delta_3)\,(bx_d' + kx_d) + \\
&(\delta_1 \delta_2 *\delta_3)\,(k + k_e)x_d + \\
&(\delta_1 \delta_2 \delta_3)\,(kx_d)
\end{aligned} \quad (14)$$

wherein, "$X_d$" denotes a target trajectory of the position x of the end effector. The successive rows of the above formulas correspond to the respective control means 11 to 18 of FIG. 2. In the above formula (14), the first row corresponds to the impedance control method, the second row corresponds to the position control method, and the eighth row corresponds to the force control method.

The formula (14) can be simplified as follows:

$$u = *\delta_1(m + *\delta_3 m_e)x_d'' + *\delta_2(b + *\delta_3 b_e)x_d' + \quad (15)$$
$$(k + *\delta_3 k_e)x_d$$

or $$\quad (16)$$
$$u = (1 - \delta(x'', 0))\,(m + (1 - \delta(-x'f, 0))m_e)x_d'' +$$
$$(1 - \delta(x', 0))\,(b + (1 - \delta(-x'f, 0))b_e)x_d' +$$
$$(k + (1 - \delta(-x'f, 0))k_e)x_d$$

The formula (16) shows an ideal form mathematically to simplify the explanation. In actuality, the function $\delta$ is substituted by the functions $\delta_{e1}$, $\delta_{e2}$ and $\delta_{e3}$ in formula (16) as follows.

$$\quad (17)$$
$$u = (1 - \delta_{e1}(x'', 0))\,(m + (1 - \delta_{e2}(-x'f, 0))m_e)x_d'' +$$
$$(1 - \delta_{e2}(x', 0))\,(b + (1 - \delta_{e3}(-x'f, 0))b_e)x_d' +$$
$$(k + (1 - \delta_{e3}(-x'f, 0))k_e)x_d$$

Figure 3:
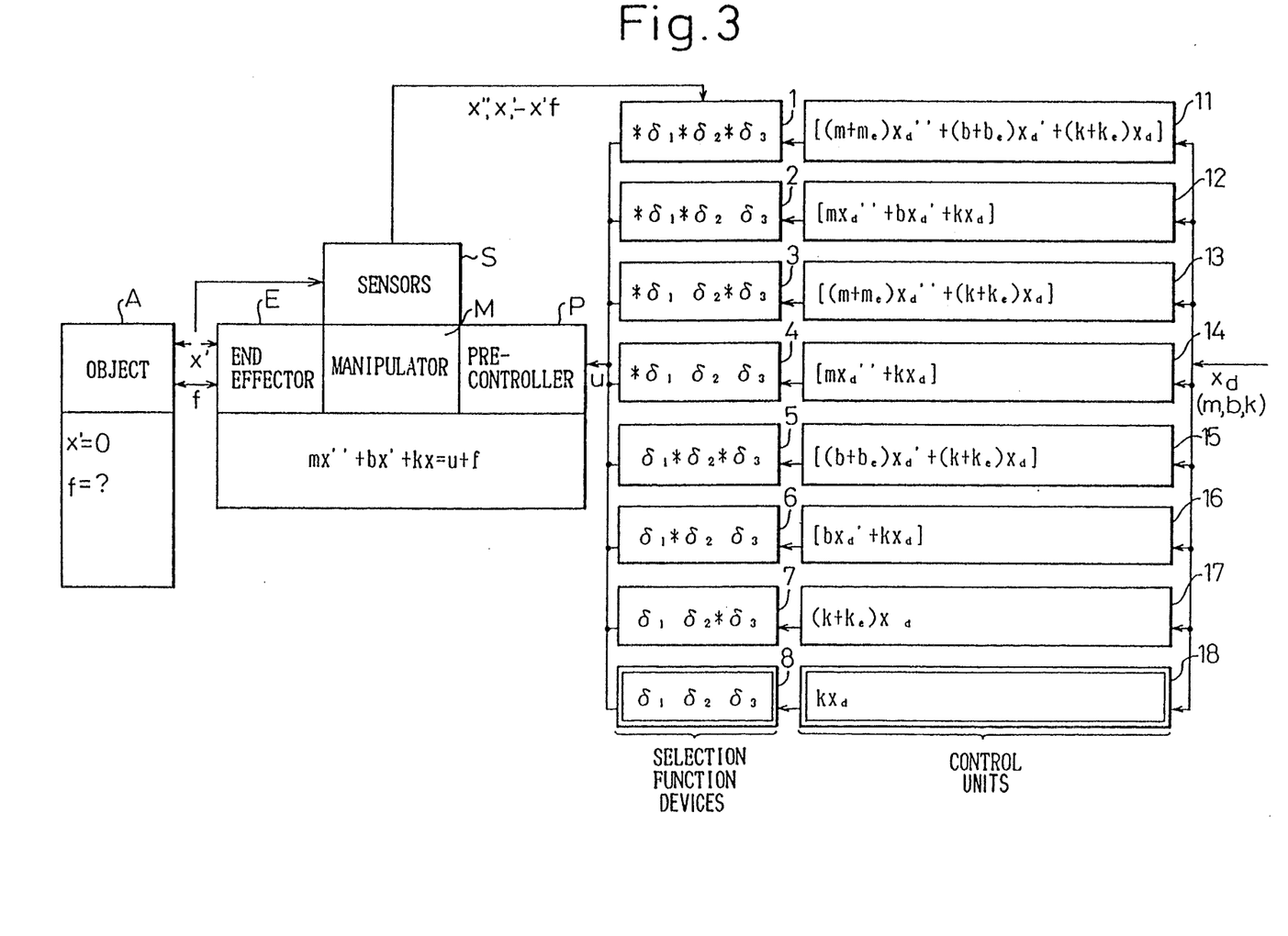
FIG. 3 shows the case of a contacting state between an end effector and a fixed and rigid object.

FIG. 3 shows the Case (1) of a contacting state between the end effector and a fixed and rigid object. As is obvious, since the end effector E contacts the object A, the position x is constant so that the velocity x' also becomes zero (i.e., x'=0). In this case, the force applied to the object is unknown (i.e., f=?).

In the formula (10), when x'=0, $\delta_2$ is given by $\delta(0, 0)$. Further, in the formula (12), when a=b, $\delta(a, b)$ is given by "1" so that $\delta_2$ becomes "1". Still further, when x'=0, the acceleration x'' becomes "0" and the work force −x'f also becomes "0". Accordingly, from the formula (12) and since a=b, $\delta_1$, $\delta_2$, and $\delta_3$ become "1" (i.e., $\delta_1 = \delta_2 = \delta_3 = 1$). In the formula (11), when $\delta_1 = \delta_2 = \delta_3 = 1$, $*\delta_1$, $*\delta_2$, and $*\delta_3$ become "0" (i.e., $*\delta_1 = *\delta_2 = *\delta_3 = 0$).

Accordingly, the selection function devices 1 to 7 become "0", and only the selection function devices 8 is selected. In this case, the control signal "u" is given by "$kx_d$" and this signal is input to the precontroller P.

Since x''=x'=x'f=0, from the formulas (4) and (16), the following formulas are obtained.

$$f = k\,x_c - u$$

$$u = k\,x_d \quad (18)$$

From these formulae, the following formula is obtained.

$$f = k(x_c - x_d) \quad (19)$$

Accordingly, and as is obvious from the above formula (19), the force "−f", which the end effector applies to the object, can be controlled by using the target trajectory $x_d$.

Figure 4:
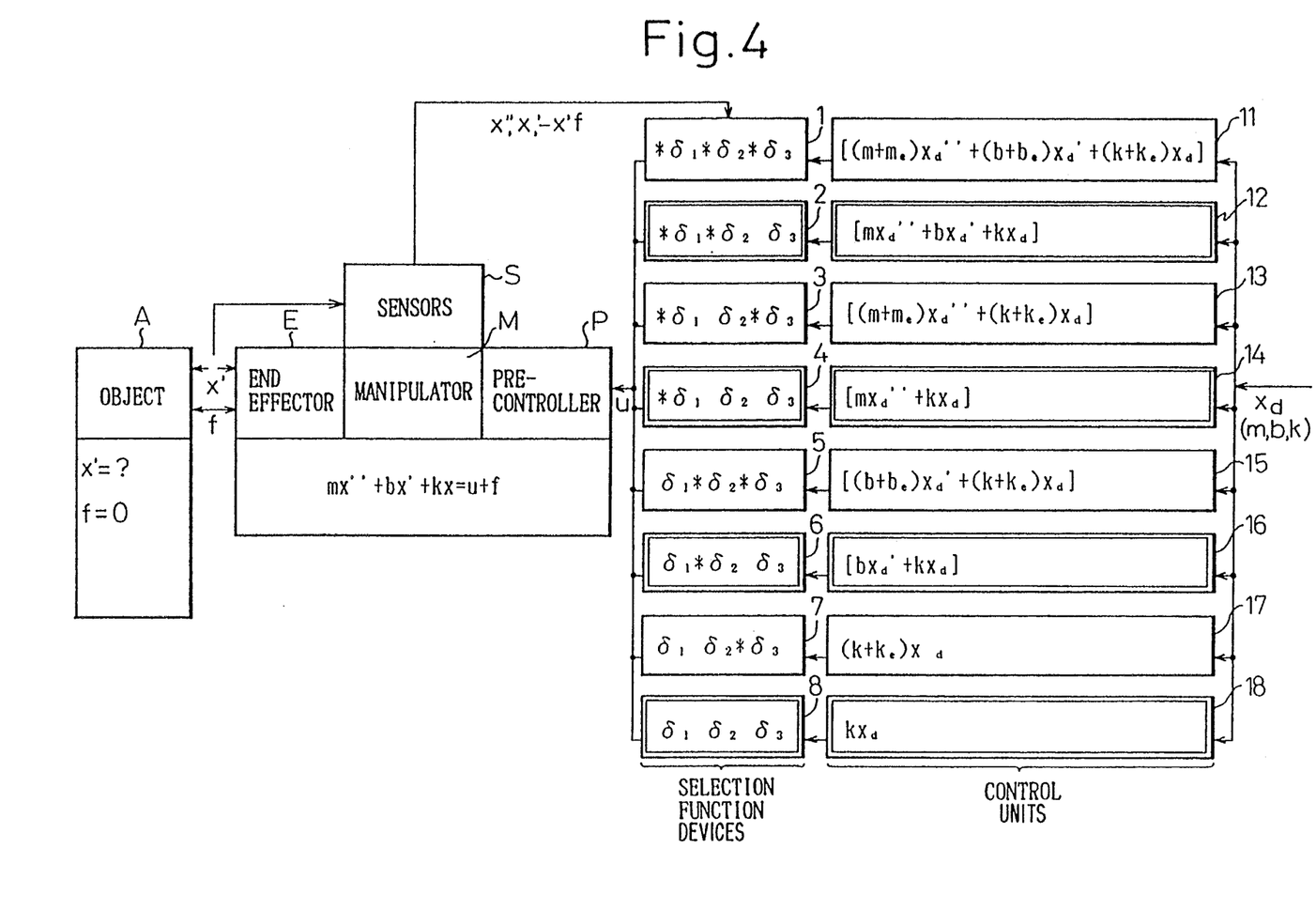
FIG. 4 shows the case of a non-contacting state between the end effector and the object.

FIG. 4 shows the Case (2) of a non-contacting state between the end effector and the object. In this case, since the end effector E does not contact the object A, the speed is unknown (i.e., x'=?) and the force is given by "0" (i.e., f=0).

When f=0, the work rate −x'f is given by "0" so that $\delta_3$ becomes "1" (i.e., $\delta_3 = 1$) from the formulas (10) and (12). Further, when $\delta_3 = 1$, $*\delta_3$ becomes "0" (i.e., $*\delta_3 = 0$) from the formula (11).

Accordingly, since $\delta_3 = 1$ and $*\delta_3 = 0$, the selection function devices 2, 4, 6 and 8 are selected and the selection function device 1, 3, 5 and 7 are not selected.

Since $f = 0$, from the formulas (6) and (16), the following formulas are given.

$$mx'' + bx' + kx = u$$

$$u = mx_d'' + bx_d' + kx_d \qquad (20)$$

From the formula (20), $$mx'' + bx' + kx = mx_d'' + bx_d' + kx_d \qquad (21)$$

From the formula (21), $$x = x_d + \lambda \qquad (22)$$

wherein, $\lim \lambda = 0$ ($\lambda$: a homogeneous solution of the formula (21)) when m, b, and k > 0. That is, the position x of the end effector E can follow the target trajectory $x_d$.

Figure 5:
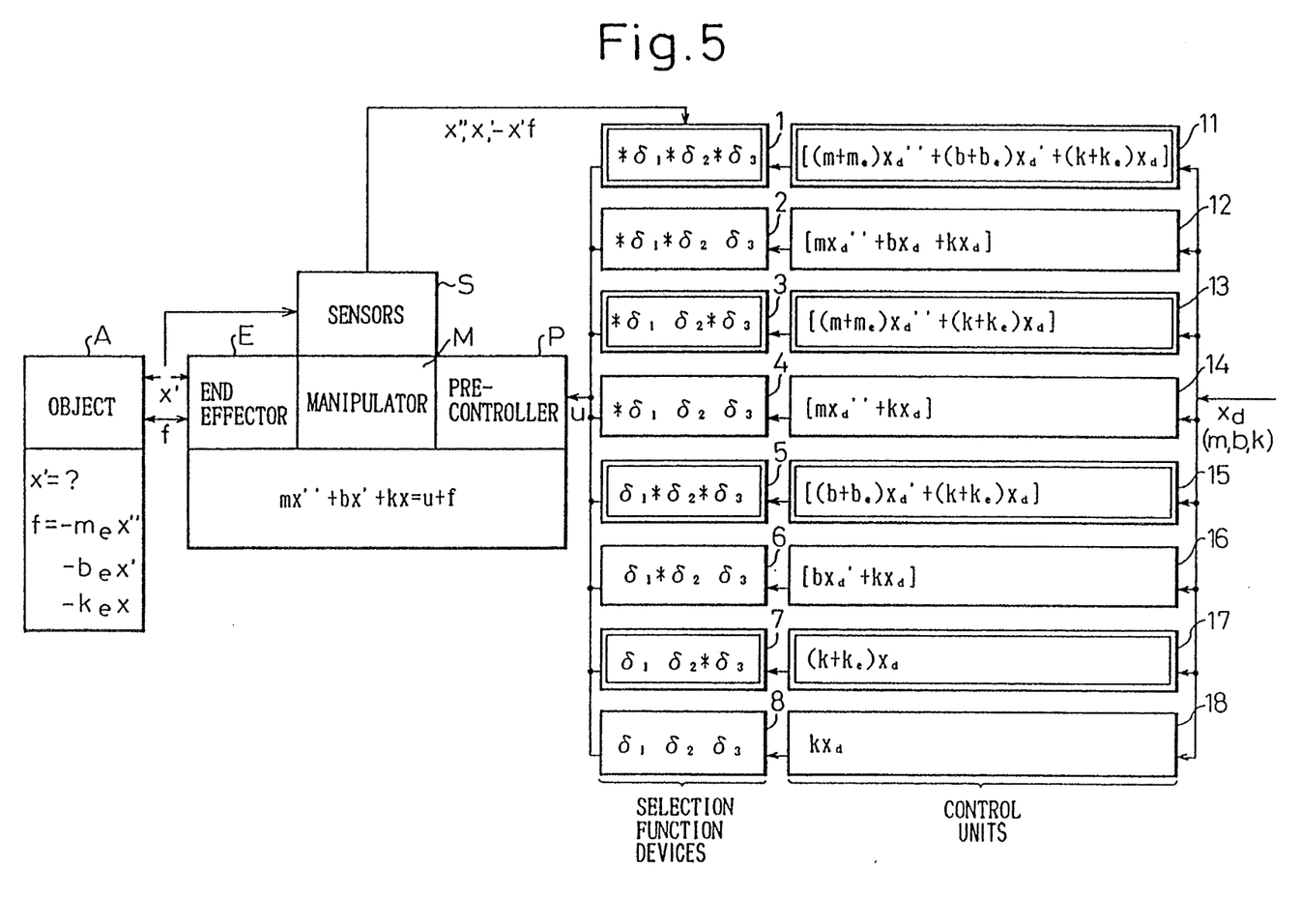
FIG. 5 shows the case of a contacting state between the end effector and a not fixed or non-rigid object.

FIG. 5 shows the Case (3) of a contacting state between the end effector and a not fixed or non-rigid object.

In this case, the velocity x' is unknown, and the force f is given approximately by $(-m_e x'' - b_e x' - k_e x)$. In the formula (12), when $a \neq b$, $\delta_3 = 0$ and $*\delta_3 = 1$ from the formula (11).

Accordingly, the selection function device 1, 3, 5 and 7 are selected because of $*\delta_3 = 1$, and the selection function devices 2, 4, 6 and 8 are not selected because of $\delta_3 = 0$.

From formulas (8) and (16), $$(m+m_e)x'' + (b+b_e)x' + (k+k_e)x = u$$

$$u = (m+m_e)x_d'' + (b+b_e)x_d' + (k+k_e)x_d \qquad (23)$$

From the formula (23), $$(m+m_e)x'' + (b+b_e)x' + (k+k_e)x = (m+m_e)x_d'' + (b+b_e)x_d' + (k+k_e)x_d \qquad (24)$$

From the formula (24), $$x = x_d + \mu \qquad (25)$$

wherein, $\lim \mu = 0$ ($\mu$: homogeneous solution of the formula (24)) when $(m+m_e)$, $(b+b_e)$, and $(k+k_e) > 0$. That is, the position x of the end effector E can follow to the target trajectory $x_d$.

We claim:

1. A robot control system comprising:
   an end effector for acting upon an object to be worked;
   a manipulator which mechanically supports the end effector and thereby is operative to move the end effector;
   a plurality of sensors mounted on the end effector and operative to detect, and to produce corresponding outputs representative of, a position (x) of the end effector, a force (f) between the end effector and the object and an acceleration (x''), a speed (x') and a work rate ($-x'f$) of the end effector;
   a pre-controller which controls movement of the end effector by the manipulator;
   a plurality of selection function means having respective outputs connected in parallel to the pre-controller and at least one of the selection function means being selected in accordance with the sensor outputs representative of the acceleration (x''), the speed (x') and the work rate ($-x'f$);
   a plurality of control means respectively connected to the plurality of selection function means and individually operative, for receiving and inputting, in common, a target trajectory ($x_d$) of the end effector and for outputting respective control signals (u) to the pre-controller to control movement of the end effector and the manipulator; and
   each said selected one of the selection function means being selected in accordance with respective values, each value being one of "0" and "other than 0", of the acceleration, the speed and the work rate sensor outputs; and the respective control signal (u), from each control means corresponding to a selected one of the selection function means, is input to the pre-controller thereby to control movement of the end effector by the manipulator.

2. A robot control system as claimed in claim 1, wherein each of the plurality of selection function means utilizes one of a Kronecher delta function and an enlarged Kronecher delta function.

3. A robot control system as claimed in claim 1, wherein movement of the manipulator is defined by the following formula for one direction component;

$$mx'' + bx'' + kx = u + f$$

wherein, "x" denotes the position of the end effector, "x'" denotes the speed of the end effector, "x''" denotes the acceleration of the end effector, "f" denotes the force applied from the object to the end effector, "u" denotes the control signal generated by the control means, "m" denotes a weight, "b" denotes a viscosity, and "k" denotes an elasticity and, further, each of these values is a "scaler" value.

4. A robot control system as claimed in claim 1, wherein the plurality of selection function means comprise respective ones of eight kinds of Kronecher delta functions.

* * * * *

UNITED STATES PATENT AND TRADEMARK OFFICE
CERTIFICATE OF CORRECTION

PATENT NO. : 5,442,269
DATED : Aug. 15, 1995
INVENTOR(S) : TAKAYAMA et al.

It is certified that error appears in the above-indentified patent and that said Letters Patent is hereby corrected as shown below:

Col. 2, line 25, change "enable" to --enabled--;
line 42, change "m denotes" to --"m" denotes--.

Col. 3, line 13, after "provided for" insert --the--;
line 41, before "denotes" insert --"u"--.

Col. 4, line 61, after "to" insert --8--.

Col. 5, line 65, change "$X_d$" to --$x_d$--.

Col. 6, line 21 (the first line of equation (17)), change "$\delta_{e2}$" to --$\delta_{e3}$--.

Col. 7, line 49, before "homogeneous" insert --a--.

Col. 8, line 43 (in the equation), change "$bx'$" to --$bx'$--.

Signed and Sealed this

Twelfth Day of December, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,442,269
DATED : Aug. 15, 1995
INVENTOR(S) : TAKAYAMA et al.

It is certified that error appears in the above-identified patent and that said Letters Patent is hereby corrected as shown below:

Col. 1,   line 14, change "selective" to --selection--;
          line 38, change "dumping" to --damping--;
          line 45, change "dumping" to --damping--.

Col. 2,   line 22, delete ";";
          line 23, after "zero" (second occurrence) insert --;--.
          line 38, delete "velocity".

Col. 3,   line 6, change "means" to --devices--;
          line 7, change "unit" to --units--;
          line 10, change "means" to --devices--;
          line 16, change "units" to --unit--;
          line 17, change "generates" to --generate-- and change "each selecting" to --the selection--;
          line 51, change "devices" to --device--.

Col. 4,   line 48, delete "-" at the beginning of the equation.

Col. 5,   line 11, change "*$\delta_1\delta_2\delta_3$)" to --(*$\delta_1\delta_2\delta_3$)--;
          line 58, change line 3 of equation 14 to read as follows:

$$(*\delta_1 * \delta_2 \delta_3)(mx_d'' + bx_d' + k_e x_d) +$$

UNITED STATES PATENT AND TRADEMARK OFFICE
CERTIFICATE OF CORRECTION

PATENT NO. : 5,442,269
DATED : Aug. 15, 1995
INVENTOR(S) : TAKAYAMA et al.

It is certified that error appears in the above-identified patent and that said Letters Patent is hereby corrected as shown below:

Col. 7, line 30, change "device" to --devices--;
line 42, change the first line of equation 24 to read as follows:

$$(m + m_e)x'' + (b + b_e)x' + (k + k_e)x = (m + m_e)x_d'' + (b$$

Signed and Sealed this

Twenty-first Day of October 1997

Attest:

BRUCE LEHMAN

Attesting Officer

Commissioner of Patents and Trademarks